(12) United States Patent
Denda et al.

(10) Patent No.: US 12,055,187 B2
(45) Date of Patent: Aug. 6, 2024

(54) WET MULTI-PLATE CLUTCH

(71) Applicant: Schaeffler Technologies AG & Co. KG, Herzogenaurach (DE)

(72) Inventors: Christian Denda, Achern (DE); Stefan Steinmetz, Essingen (DE); Florian Krebs, Lauf (DE); Jens Kramer, Baden-Baden (DE); Laurent Ineichen, Strasbourg (FR); Tobias Hebgen, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/037,835

(22) PCT Filed: Oct. 25, 2021

(86) PCT No.: PCT/DE2021/100853
§ 371 (c)(1),
(2) Date: May 19, 2023

(87) PCT Pub. No.: WO2022/111750
PCT Pub. Date: Jun. 2, 2022

(65) Prior Publication Data
US 2023/0417293 A1    Dec. 28, 2023

(30) Foreign Application Priority Data

Nov. 27, 2020 (DE) .................... 10 2020 131 567.8
May 12, 2021 (DE) .................... 10 2021 112 393.3

(51) Int. Cl.
*F16D 25/12* (2006.01)
*F16D 13/64* (2006.01)
*F16D 25/0638* (2006.01)

(52) U.S. Cl.
CPC ......... *F16D 25/123* (2013.01); *F16D 13/646* (2013.01); *F16D 25/0638* (2013.01)

(58) Field of Classification Search
CPC .............. F16D 25/0638; F16D 25/123; F16D 13/52–2013/565; F16D 13/72–74; F16D 13/644–646; F16D 2069/004
See application file for complete search history.

(56) References Cited

U.S. PATENT DOCUMENTS 4,287,978 A * 9/1981 Staub, Jr. .............. F16D 25/123
                                                         192/113.36
6,047,803 A * 4/2000 Pinschmidt ............. F16D 13/52
                                                          192/70.11
(Continued)

FOREIGN PATENT DOCUMENTS

DE    102014209963 A1    12/2014
DE    102014221577 A1    5/2015
(Continued)

*Primary Examiner* — Ernesto A Suarez
*Assistant Examiner* — James J Taylor, II

(57) ABSTRACT

A wet multi-plate clutch includes a plate carrier with a pair of fluid passage openings and a friction plate rotationally fixed and axially displaceable relative to the plate carrier. The friction plate has a carrier element and a pair friction pads fastened to the carrier element and delimiting a groove. The groove includes a groove geometrical center line. The groove geometrical center line may extend radially through a one of the pair of fluid passage openings, or it may extend radially between the pair of fluid passage openings. If the groove geometrical center line extend radially between the pair of fluid passage openings, one of the pair of friction pads may include a pad geometrical center line extending along a radial extent through a one of the pair of fluid passage openings.

13 Claims, 4 Drawing Sheets

(56) References Cited

U.S. PATENT DOCUMENTS

| | | | | |
|---|---|---|---|---|
| 6,712,190 B2 * | 3/2004 | Kitaori | ............... | F16D 25/123 |
| | | | | 192/113.36 |
| 7,350,631 B2 * | 4/2008 | Furuichi | ............ | F16D 25/0638 |
| | | | | 192/85.41 |
| 8,113,330 B2 * | 2/2012 | Sudau | ............... | F16D 13/648 |
| | | | | 192/113.36 |
| 9,027,728 B2 * | 5/2015 | Hiramatsu | ............ | F16D 65/122 |
| | | | | 192/113.36 |
| 9,841,065 B2 * | 12/2017 | Okamura | ............... | F16D 13/74 |
| 10,138,949 B2 * | 11/2018 | Hattori | ............... | F16D 13/52 |
| 10,302,150 B2 * | 5/2019 | Ito | ............... | F16D 25/0638 |
| 2014/0174877 A1 | 6/2014 | Penz et al. | | |

FOREIGN PATENT DOCUMENTS

| | | |
|---|---|---|
| DE | 102015201550 A1 | 8/2015 |
| DE | 102017124330 A1 | 4/2019 |
| JP | 2002081463 A | 3/2002 |
| JP | 2002340071 A | 11/2002 |
| JP | 2016070432 A | 5/2016 |
| WO | 2007012312 A1 | 2/2007 |
| WO | 2015046461 A1 | 4/2015 |

\* cited by examiner

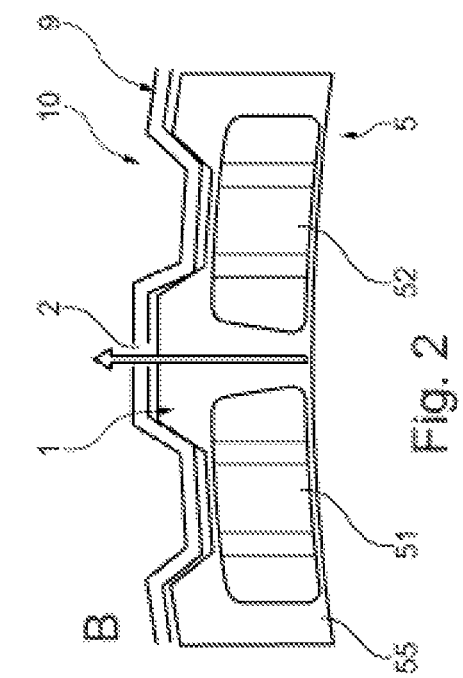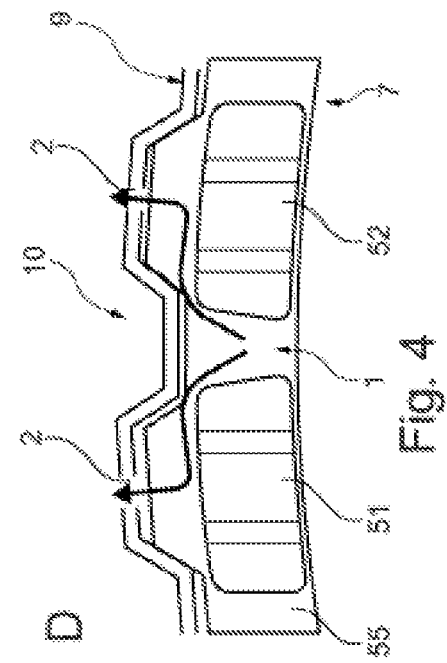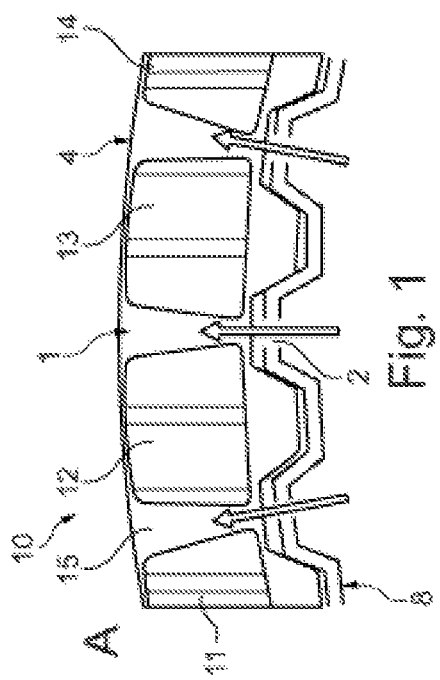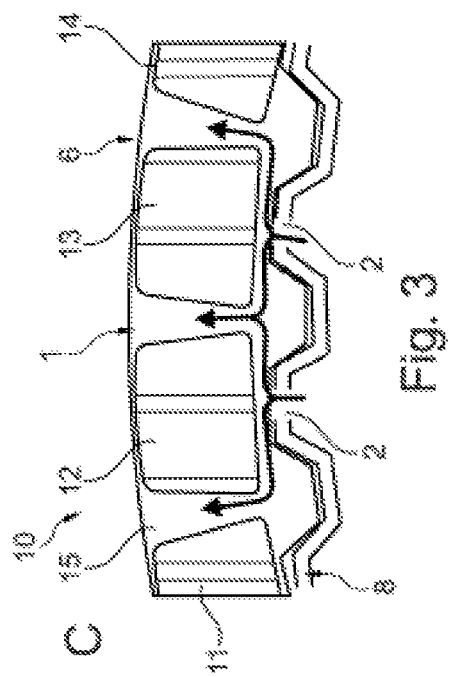

WET MULTI-PLATE CLUTCH

CROSS-REFERENCE TO RELATED APPLICATIONS

This application is the United States National Phase of PCT Appln. No. PCT/DE2021/100853 filed Oct. 25, 2021, which claims priority to German Application Nos. DE102020131567.8 filed Nov. 27, 2020 and DE102021112393.3 filed May 12, 2021, the entire disclosures of which are incorporated by reference herein.

TECHNICAL FIELD

The present disclosure relates to a wet multi-plate clutch.

BACKGROUND

Wet multi-plate clutches and brakes are widely used in conventional power-shiftable transmissions, in innovative hybrid modules in heavy-duty drive trains or in shiftable e-axles, and they represent high-performance, heavy-duty components. The demands for lower CO2 emissions and improved efficiency of drive trains in automotive applications are of great importance. In addition to reducing load-independent losses in shifting elements, the thermal load and adequate cooling must be taken into account. In the area of tension between friction characteristics, heat balance and efficiency, the design of the groove pattern of the friction plate and a targeted oil flow in the friction system play a central role.

DE 10 2017 124 330 A1 discloses a wet multi-plate clutch having clutch plates which are connected for conjoint rotation to a plate carrier but which is displaceable in the axial direction and which has fluid passage openings.

DE 10 2014 221 577 A1 discloses a wet clutch having a plate carrier that has fluid pockets and fluid passage openings.

DE 10 2015 201 550 A1 discloses a clutch having an inner carrier and an outer carrier, which are arranged for conjoint rotation about a common axis of rotation, wherein a housing for accommodating the inner carrier, the outer carrier and the friction partner is flooded with a liquid, wherein the inner carrier has a first recess and the outer support has a second recess, in each case for the radial passage of liquid in the region of the friction partners.

SUMMARY

The present disclosure provides an improved convective cooling/cooling effect and/or minimized drag losses by suitably aligning the groove of the friction plate with the hole pattern in the plate carrier.

According to the present disclosure, a wet multi-plate clutch is therefore provided with clutch plates which are connected for conjoint rotation to a plate carrier but which is displaceable in the axial direction, and which has fluid passage openings. The groove, e.g., at least one geometrical center line of the groove of the friction plate, extends along a radial extent through the fluid passage opening in the plate carrier.

The profile of the friction plate may be fluidically improved by the claimed arrangement of the grooves in such a way that the flow resistance is reduced and thus the de-oiling of the multi-plate clutch with fluid is improved and the drag torque is reduced.

According to the present disclosure, a wet multi-plate clutch is therefore provided with clutch plates which are connected for conjoint rotation to a plate carrier which is displaceable in the axial direction and which has fluid passage openings. The groove of the friction plate extends along a radial extent through the center between two immediately adjacent fluid passage openings in the plate carrier, and a geometrical center line of at least one friction pad delimits the groove and extends along a radial extent through the fluid passage opening.

The arrangement of the grooves, e.g., the friction pads, improves the profile of the friction plate in terms of flow so that the flow resistance is increased and thus an increase in the cooling effect is achieved by deflecting the oil flow.

The friction pads may have the shape of isosceles trapezoids. The trapezoidal friction pads are attached to a carrier plate, for example a carrier sheet. The carrier plate essentially has the shape of a circular ring plate. A toothing is provided to be radial on the inside or outside of the carrier plate, which serves to create a connection for conjoint rotation with a plate carrier. An edge on the carrier plate may remain free of friction pads radially on the inside and radially on the outside. In this way, tolerances in the size and/or shape of the friction pads can be compensated for when they are fastened to the carrier plate. In addition, the friction pads may be evenly spaced from one another in the circumferential direction.

The trapezoidal friction pads may be arranged to be radially on the inside with the respective longer base sides thereof. The distances between the friction pads arranged in this way result in grooves between the friction pads, which widen from radially inwards to radially outwards. The grooves themselves extend in radial directions. The friction pads are rounded at the corners thereof.

The fluid passage openings are also referred to as oil bores if oil is used as the fluid, and the passage openings are designed as bores. The plate carrier includes, for example, two, four or more fluid passage openings, which may be arranged diametrically in pairs. Like the friction pads, the fluid passage openings may be distributed uniformly in the circumferential direction. In this sense one can also speak of a division. The clutch plate may include a number of friction pads which is greater than a number of fluid passage openings in the plate carrier. The number of friction pads may be an integral multiple of the number of fluid passage openings in the plate carrier.

In an exemplary embodiment of the wet multi-plate clutch, the groove includes grooves which are delimited by friction pads which are fastened to a carrier element. The grooves are formed by friction-lining-free regions between the friction-lining pads. A groove depth results from a thickness of the friction pads on the carrier element. In a further exemplary embodiment of the wet multi-plate clutch, all of the fluid passage openings are arranged in tooth tip regions of a toothing of the plate carrier. Tooth tip regions are radial outer toothing regions which are arranged to be radial on the outside either on an internal toothing or on an external toothing. Analogously, radially inner toothing regions of the toothing of the plate carrier are referred to as tooth base regions. The carrier element is equipped radially on the inside or radially on the outside with a toothing which is designed to be complementary to the toothing of the plate carrier. The intermeshing toothings create a connection for conjoint rotation between the plate carrier and the carrier element or the respective clutch plate.

In a further exemplary embodiment of the wet multi-plate clutch, the plate carrier has additional fluid passage openings in tooth base regions of the toothing of the plate carrier in addition to fluid passage openings in the tooth tip regions of a toothing of the plate carrier. In this way, more oil can be made available in a friction space, which is described below.

In another exemplary embodiment of the wet multi-plate clutch, the friction plate has additional grooves that extend along radial extents through the fluid passage openings in the tooth base regions of the toothing of the plate carrier. In this way, an effective flow of oil through the friction space can also be achieved here.

In another exemplary embodiment of the wet multi-plate clutch, the friction plate has additional embossed grooves that extend along radial extents through the fluid passage openings in the tooth base regions of the toothing of the plate carrier. As a result, the flow cross-section available for the fluid can be increased.

In a further exemplary embodiment of the wet multi-plate clutch, the friction plate has embossed grooves which are formed in the friction pads. The embossed grooves in the friction pads are less deep than the grooves between the friction pads. The fluid flow through the friction space can be additionally influenced or controlled by the shape and size of the embossed grooves.

In a further exemplary embodiment of the wet multi-plate clutch, the blind groove has the shape of a rectangle. As described above, the grooves between the friction pads can be widened from radially inside to radially outside in a simple manner.

The present disclosure also relates to a clutch plate for a wet multi-plate clutch as described above. The clutch plate can be dealt with separately.

The present disclosure may optionally also relate to a friction pad, a plate carrier and/or a carrier element for such a clutch plate.

BRIEF DESCRIPTION OF THE DRAWINGS

Further configurations of the present disclosure are the subject of the following figures and the description thereof. Specifically:

FIG. 1 shows a clutch plate designed as a friction plate having friction pads which are fastened to a carrier element which is connected for conjoint rotation to a plate carrier designed as an inner plate carrier, according to a first exemplary embodiment;

FIG. 2 shows a variant of the first exemplary embodiment having a plate carrier designed as an outer plate carrier;

FIG. 3 shows a view similar to that in FIG. 1 according to a second exemplary embodiment;

FIG. 4 shows a view similar to that in FIG. 2 according to a second exemplary embodiment;

DETAILED DESCRIPTION

Figure 5:
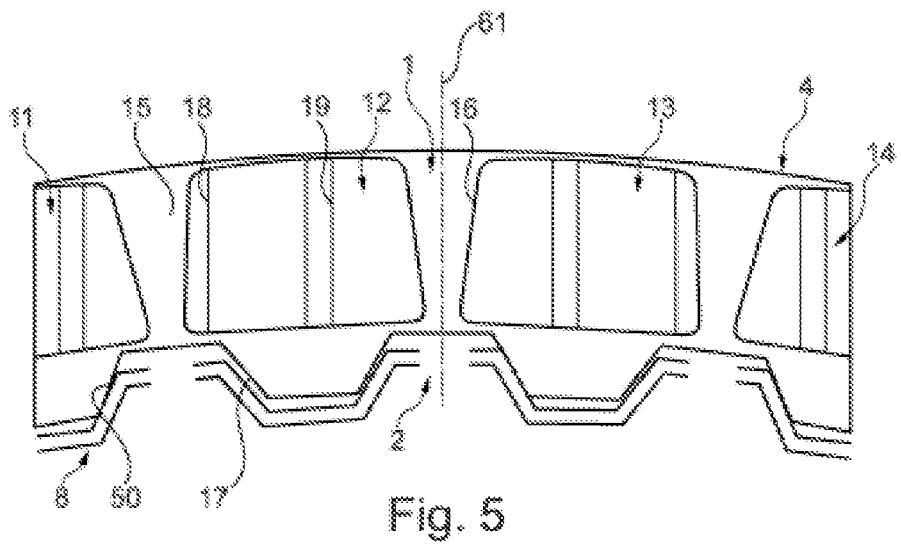
FIGS. 5 to 8 show enlarged representations of FIGS. 1 to 4 to illustrate further details of the exemplary embodiments.

A wet multi-plate clutch includes two plate carriers, one of which is designed as an outer plate carrier and the other as an inner plate carrier, and of which only one plate carrier is shown in each of the figures. A wet multi-plate clutch also includes a plate pack with clutch plates. The clutch plates are designed alternately as friction plates and as steel plates. Inner plate carrier and outer plate carrier are equipped with a toothing. The toothing alternately has a tooth tip region and a tooth base region. In the following, the radially outer toothing regions are referred to as tooth tip regions both in the case of the outer plate carriers and also in the inner plate carriers, while the radially inner toothing regions are referred to as tooth base regions.

Within the scope of this document, only the regions 1 between the friction pads that are free of friction linings are explicitly referred to and addressed as grooves 1. In addition to these grooves 1, embossed grooves are also shown in the figures. These are referred to and addressed as embossed grooves in the context of this document.

In the plate carriers, in the inner plate carrier, which is also referred to as the inner multi-plate carrier and/or in the outer plate carrier, which is also referred to as the multi-outer plate carrier, there are fluid passage openings (oil bores 2) distributed over the circumference at various axial positions, through which a fluid got into a friction space. A space that may be designed as an annular space between the two plate carriers is referred to as a friction space. Because of the axial displacement, the axial position of the, or some of the, clutch plates changes when the multi-plate clutch is actuated. The clutch plates essentially have a rectangular profile. Depending on the axial position of the friction plates, the friction lining of one friction plate or several friction plates may be located above or in front of one of the oil bores 2 (fluid passage openings) and thus impede the fluid supply into the friction space. In this case, only a restricted flow cross-section is available for the fluid, which impairs the flow of the fluid and generally increases the flow resistance for the fluid.

The arrangement of the grooves allows the profile of the friction plate to be fluidically improved in such a way that the flow resistance is reduced and thus the supply of fluid to the multi-plate clutch is improved and the drag torque is reduced.

Due to the arrangement of the grooves, the profile of the friction plate can be improved in terms of flow in such a way that the flow resistance is increased and thus an increase in the cooling effect is achieved by deflecting the oil flow.

FIG. 1 and FIG. 2 show the arrangement of the grooves to be radial to the oil bore in the plate carrier. FIG. 1 shows this using the example of an inner plate carrier and FIG. 2 using the example of an outer plate carrier.

Reduction of the Drag Torque Through Optimal De-Oiling of the Friction System Through Direct Oil Supply Internal toothing (FIG. 1): Optimum radial flow through the friction system and improvement in de-oiling/displacement of the air intake towards lower rotational speeds (reduction of drag torque). The bores are shown here in the tooth tip region of the internal toothing. With the same arrangement of the grooves, namely radial to the oil bore, the bores can alternatively also be provided in each case at the tooth base region of the internal toothing. In the case of additional bores in the tooth base region, either no further grooves are provided or, alternatively, further grooves or embossed grooves are provided to be radial to the additional bores in the tooth base region.

External toothing (FIG. 2): Optimum radial flow through the friction system and improved de-oiling on the outer plate carrier. Reduction of the accumulation of the cooling oil on the outer diameter and reduction of the shear in the oil (reduction of drag torque). The bores are shown here in the tooth tip region of the external toothing. With the same arrangement of the grooves, namely radial to the oil bore, the bores can alternatively also be provided in each case on the tooth base region of the external toothing. In the case of additional bores in the tooth base region, either no further grooves are provided or, alternatively, further grooves or embossed grooves are provided to be radial to the additional bores in the tooth base region.

FIG. 3 and FIG. 4 show the arrangement of the grooves offset to the oil bore in the plate carrier:

Increasing the Cooling Effect by Redirecting the Oil Flow in the Friction System Internal toothing (FIG. 3): Redirecting the cooling oil volume flow leads to better distribution of the cooling oil in the friction system and a larger contact area for convective heat transfer (cooling oil/steel fins).

External toothing (FIG. 4): Redirecting the cooling oil volume flow leads to a damming effect on the cooling oil. This leads to improved wetting of the steel laminations by the cooling oil and thus leads to an improved cooling effect.

Alignment of the Groove Relative to the Bore in the Plate Carrier with Regard to Oil Removal and Drag Torque FIG. 5: Grooving/segmentation 1 of the friction lining of the friction plates is adapted to the toothing pitch of the plate carrier: Alignment of the groove/segmentation 1 is oriented to be radial in the direction of the oil bores 2 of the inner plate carrier. Grooving can be done, for example, by embossing, milling, or punching (segmentation). The number of holes can differ from the number of grooves/segmentation of the friction lining. The diameter of the oil bore 2 and the width of the groove can vary.

Figure 6:
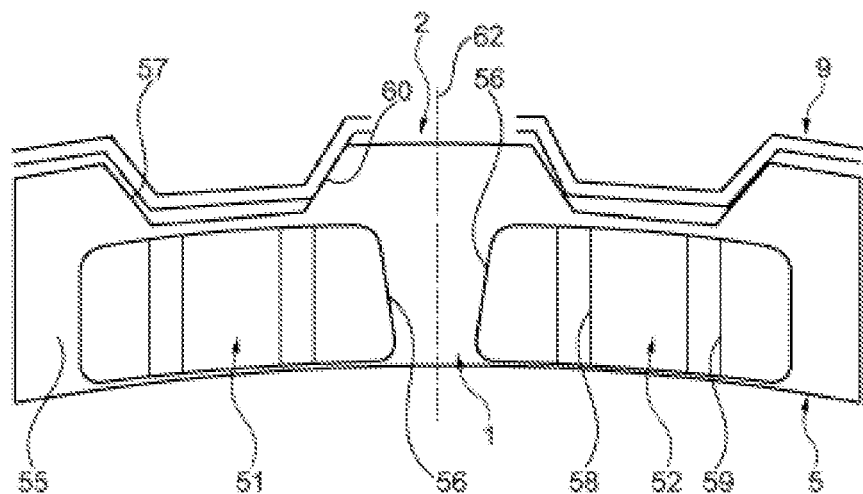

FIG. 6 is analogous to FIG. 5, but having oil bores 2 in the outer plate carrier: Alignment of the groove/segmentation 1 is oriented to be radial in the direction of the oil bores 2 of the outer plate carrier.

Figure 7:
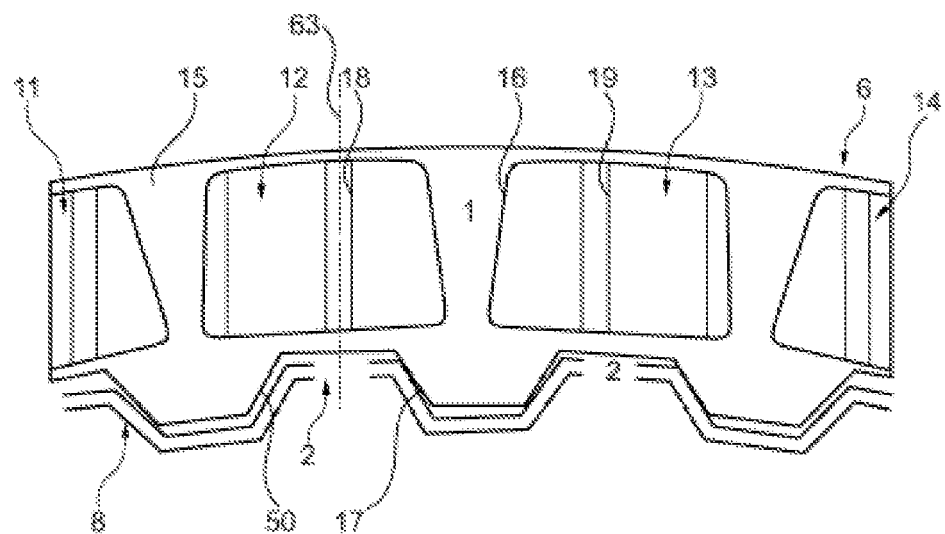

Alignment of the Groove Relative to the Hole in the Plate Carrier with Regard to Cooling FIG. 7: Grooving/segmentation 1 of the friction lining of the friction plates is adapted to the toothing pitch of the plate carrier: Radial alignment of the groove/segmentation 1 in the circumferential direction offset from the radial through oil bores 2 of the inner plate carrier. Grooving can be done, for example, by embossing, milling, or punching (segmentation). The number of holes can differ from the number of grooves/segmentation of the friction lining. Oil bore diameter and groove width may vary.

Figure 8:
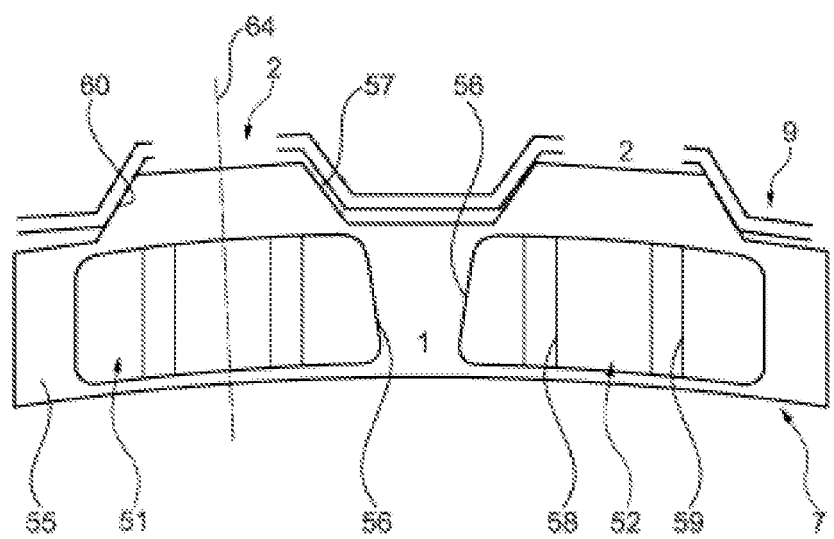

FIG. 8 is analogous to FIG. 7, but having oil bores 2 in the outer plate carrier: Radial alignment of the groove/segmentation 1 in the circumferential direction offset from the radial through oil bores 2 of the outer plate carrier.

General Drag Torque, Oil Removal, Air Intake

Figure 9:
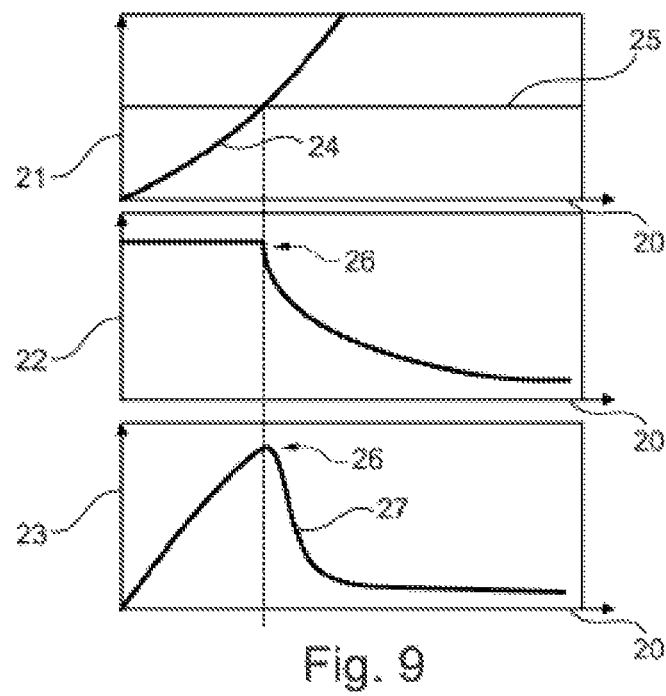
FIG. 9 shows three Cartesian coordinate diagrams to illustrate relationships between an air intake and a drag torque.
Figure 10:
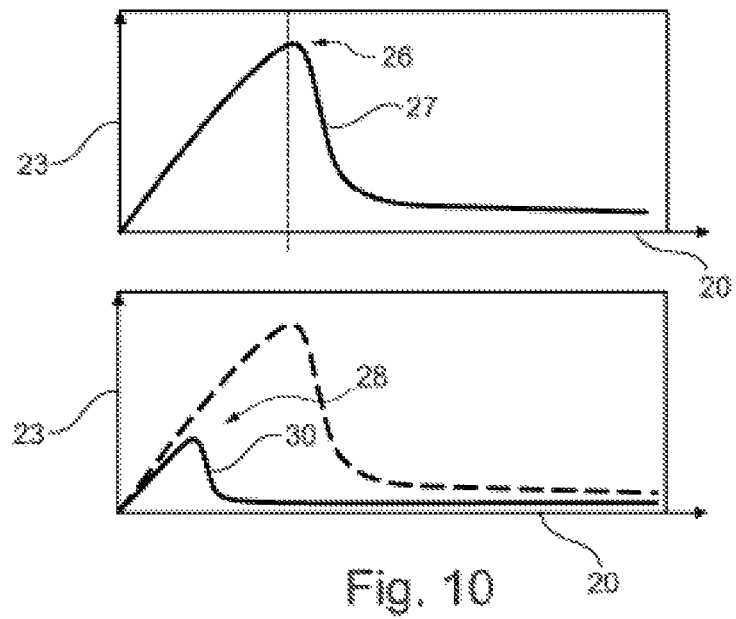
FIG. 10 shows two further Cartesian coordinate diagrams to illustrate the task and the improvements which are achieved with the exemplary embodiments described.

FIG. 9 shows the causal relationships.
FIG. 10 shows the goal/improvement:

Shifting the Onset of the Air Intake to Lower Rotational Speeds

Oil removal/air intake is improved by the radial arrangement of the groove in a radial extent to the bore in the plate carrier. FIG. 9 illustrates how an air intake 26 is effected by a conveyed volume flow 24 if this exceeds the supplied volume flow 25. From this limit, the gap fill level 26 decreases and the lubricating gap between the plates contains air. Above this limit, a supplied volume flow 25 contains air. The bottom of FIG. 10 shows that the air intake 26 occurs at a maximum drag torque 27.

The air intake is improved by the radial arrangement of the groove in a radial extent to the bore in the plate carrier. In FIG. 10, it is shown how a shift of the air intake 28 to a low rotational speed is achieved in a drag torque curve 30. The conveying effect of the cooling and/or lubricating medium can be improved by the groove/segmentation 1 shown in FIGS. 1 through 8.

In the FIGS. 1, 2 and 3, 4 two exemplary embodiments for the design of a clutch plate 4, 5; 6, 7 for a wet multi-plate clutch 10 are each depicted in a top view of a section of the clutch plate 4, 5; 6, 7.

The clutch plates 4 and 6 in FIGS. 1 and 3 are hooked with an internal toothing into a complementary external toothing of a plate carrier 8 designed as an internal plate carrier. The clutch plates 5 and 7 in FIGS. 2 and 4 are suspended with an external toothing in a complementary internal toothing of a plate carrier 9 designed as an external plate carrier.

The internal toothing of the clutch plates 4, 6 is provided on a carrier element 15. The carrier element 15 is, for example, a carrier sheet onto which trapezoidal friction pads 11 to 14 are glued. The outer toothings of the clutch plates 5, 7 in FIGS. 2 and 4 are provided on a carrier element 55 to which friction pads 51, 52 are glued. Like the friction pads 11 to 14 in FIGS. 1 and 3, the friction pads 51, 52 each have the shape of a trapezoid, the longer base side of which is arranged to be radially inward on the respective carrier element 15; 55.

Arrows in FIGS. 1 to 4 indicate how a fluid, e.g., oil, is guided through a friction space for cooling and/or lubrication, which friction space in the multi-plate clutch 10 essentially has the shape of an annular space. In FIGS. 1 and 2, radial arrows illustrate how the fluid passes unhindered radially through a groove 1 between the friction pads 11 to 14; 51, 52. In FIGS. 3 and 4, branched arrows indicate how the fluid entering radially on the inside flows through the groove 1 to bypass the friction pads 11 to 14; 51, 52.

In FIGS. 5 to 8, the exemplary embodiments of FIGS. 1 to 4 are enlarged and shown with additional reference numbers. As in FIGS. 1 to 4, 2 designates fluid passage openings through which the fluid is supplied radially on the inside through the respective plate carrier 8, 9. Through the groove 1, the fluid supplied radially on the inside is guided differently through the friction space, which is limited by the respective clutch plate 4; 5; 6; 7.

In the case of the clutch plates 4 and 6 illustrated in FIGS. 5 and 7, the groove 1 comprises a groove 16 which is delimited in each case by two adjacent friction pads 12, 13. In FIG. 5, the groove 16 is arranged in a radial extent of the fluid passage opening 2 of the plate carrier 8. In FIG. 7, the groove 16 is offset in the circumferential direction between two fluid passage openings 2.

In FIGS. 6 and 8, the groove 1 comprises a groove 56 which is delimited by the two friction pads 51 and 52. In FIG. 6, the groove 56 is arranged on a common radial line with the fluid passage opening 2 of the plate carrier 9. In FIG. 8, the groove 56 is arranged to be offset in the circumferential direction between two fluid passage openings 2 of the plate carrier 9.

The friction pads 11 to 14 and 51, 52 are equipped with embossed grooves 18, 19; 58, 59. The embossed grooves 18, 19; 58, 59 extend parallel to each other on each pad. The individual friction pads 11 to 14 and 51, 52 are each aligned to be radial.

In FIG. 7, the embossed groove 18 is arranged on a common radial line with the fluid passage opening 2 of the plate carrier 8. The embossed groove 19 is assigned to a fluid passage opening 2 of the plate carrier 8 that is adjacent in the circumferential direction. In FIGS. 5 and 7, a toothing of the carrier element 15 designed as an internal toothing is denoted by 17. With this toothing 17, the carrier element 15 is hooked into a toothing 50 of the plate carrier 8, designed as a complementary external toothing. Through the intermeshing of the toothings 17 and 50 is created a connection for conjoint rotation between the plate carrier 8 and the respective clutch plate 4; 6.

In FIGS. 6, 8, the carrier element 55 is equipped with a toothing 57 designed as an external toothing, which engages in a complementary toothing 60 of the plate carrier 9. A connection for conjoint rotation is also created here between the carrier element 55 and the plate carrier 9.

A geometrical center line 61 illustrates in FIG. 5 that the groove of the groove 1 between the friction pads 12 and 13 extends along a radial extent through the fluid passage opening 2 in the plate carrier 8.

A geometrical center line 62 illustrates in FIG. 6 that the groove of the groove 1 between the friction pads 51 and 52 extends along a radial extent through the fluid passage opening 2 in the plate carrier 9.

A geometrical center line 63 of the friction pad 12 is drawn in FIG. 7. Unlike what is shown in FIG. 7, the geometrical center line 63 corresponds to an axis of symmetry of the friction pad 12.

The geometrical center line 63 or axis of symmetry of the friction pad 12 extends along a radial extent through the fluid passage opening 2 in the plate carrier 8. At the same time, the geometrical center line 63 or axis of symmetry of the friction pad 12 in FIG. 7 coincides with a geometrical center line 63 of the embossed groove 18.

A geometrical center line 64 is drawn in FIG. 8, which corresponds to an axis of symmetry of the friction pad 51. The geometrical center line 64 or axis of symmetry extends along a radial extent through the fluid passage opening 2 of the plate carrier 9.

REFERENCE NUMERALS

1 Grooving
2 Fluid passage opening
4 Clutch plate
5 Clutch plate
6 Clutch plate
7 Clutch plate
8 Plate carriers (inside)
9 Plate carrier (outside)
10 Wet multi-plate clutch
11 Friction pad
12 Friction pad
13 Friction pad
14 Friction pad
15 Carrier element
16 Groove
17 Toothing
18 Embossed groove
19 Embossed groove
20 X-axis
21 Y-axis
22 Y-axis
23 Y-axis
24 Conveyed volume flow
25 Supplied volume flow
26 Air intake
27 Drag torque
28 Air intake
30 Drag torque curve
50 Toothing
51 Friction pad
52 Friction pad
55 Carrier element
56 Groove
57 Toothing
58 Embossed groove
59 Embossed groove
60 Toothing
61 Geometrical center line
62 Geometrical center line
63 Geometrical center line
64 Geometrical center line

The invention claimed is:

1. A wet multi-plate clutch, comprising clutch plates connected to a plate carrier for conjoint rotation while being displaceable in an axial direction, the plate carrier having fluid passage openings, wherein at least one of the clutch plates, or each of the clutch plates, is designed as a friction plate with a groove delimited by friction pads, wherein:
the groove extends along a radial extent through a center between two immediately adjacent fluid passage openings of the fluid passage openings, and a geometrical center line of one of the friction pads extends along a radial extent through one of the two immediately adjacent fluid passage openings.

2. The wet multi-plate clutch of claim 1, wherein the groove is delimited by the friction pads fastened to a carrier element.

3. The wet multi-plate clutch of claim 1, wherein all of the fluid passage openings are arranged in tooth tip regions of a toothing of the plate carrier.

4. The wet multi-plate clutch according to claim 1, wherein the friction plate has embossed grooves which are formed in the friction pads.

5. The wet multi-plate clutch of claim 1, wherein the friction pads have the shape of trapezoids.

6. The wet multi-plate clutch according to claim 1, wherein:
the friction pads comprise embossed grooves; and
the geometrical center line extends along the radial extent through one of the embossed grooves.

7. A wet multi-plate clutch, comprising:
a plate carrier comprising a pair of immediately adjacent fluid passage openings; and
a friction plate rotationally fixed and axially displaceable relative to the plate carrier, the friction plate comprising:
a carrier element;
a pair of friction pads fastened to the carrier element and delimiting a groove, the groove comprising a groove geometrical center line extending radially through a center between the pair of immediately adjacent fluid passage openings; and
one of the pair of friction pads comprises a pad geometrical center line extending along a radial extent through a one of the pair of immediately adjacent fluid passage openings.

8. The wet multi-plate clutch of claim 7 wherein:
the pair of friction pads is included in a plurality of pairs of friction pads; and
the groove is included in a plurality of grooves delimited by the plurality of pairs of friction pads.

9. The wet multi-plate clutch of claim 7, wherein:
the plate carrier comprises a toothing;
the toothing comprises tooth tip regions and tooth base regions; and
the pair of immediately adjacent fluid passage openings are arranged in respective tooth tip regions; or the pair of immediately adjacent fluid passage openings are arranged in respective tooth base regions.

10. The wet multi-plate clutch of claim 7, wherein the pair of friction pads comprise respective embossed grooves formed therein.

11. The wet multi-plate clutch of claim 7, wherein the pair of friction pads each have a trapezoidal shape.

12. The wet multi-plate clutch of claim 7, wherein:
the pair of friction pads comprise respective embossed grooves formed therein; and
a geometrical center line of one of the pair of immediately adjacent fluid passage openings coincides with a geometrical center line of one of the respective embossed grooves.

13. The wet multi-plate clutch of claim 7 wherein a geometrical center line of one of the pair of immediately adjacent fluid passage openings is an axis of symmetry for one of the friction pads of the pair of friction pads.

* * * * *